(12) United States Patent
Yu (10) Patent No.: US 9,204,440 B2
(45) Date of Patent: Dec. 1, 2015

(54) SCHEDULING IMPLEMENTATION METHOD, APPARATUS, AND SYSTEM (71) Applicant: Huawei Technologies Co., Ltd., Shenzhen, Guangdong (CN)

(72) Inventor: Fuqiang Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 13/893,506

(22) Filed: May 14, 2013

(65) Prior Publication Data
US 2014/0003396 A1 Jan. 2, 2014

(30) Foreign Application Priority Data

Jun. 30, 2012 (CN) .......................... 2012 1 0223043

(51) Int. Cl.
- *H04B 7/216* (2006.01)
- *H04W 72/04* (2009.01)
- *H04W 72/12* (2009.01)

(52) U.S. Cl.
CPC ...... *H04W 72/0446* (2013.01); *H04W 72/1247* (2013.01)

(58) Field of Classification Search
CPC .. H04L 1/1692; H04L 1/1887; H04L 12/2838
USPC ........................................................ 370/335
See application file for complete search history.

(56) References Cited

U.S. PATENT DOCUMENTS

| | | | |
|---|---|---|---|
| 5,220,653 A * | 6/1993 | Miro ..................... | G06F 3/0601 718/107 |
| 2003/0039213 A1 | 2/2003 | Holtzman et al. | |
| 2006/0080486 A1 * | 4/2006 | Yan ........................ | G06F 9/5038 710/123 |
| 2007/0143290 A1 * | 6/2007 | Fujimoto et al. .................. | 707/9 |
| 2008/0222640 A1 | 9/2008 | Daly et al. | |
| 2011/0158094 A1 * | 6/2011 | Lee .......................... | H04L 47/10 370/231 |
| 2012/0180060 A1 * | 7/2012 | Daly ..................... | G06F 9/4881 718/103 |

FOREIGN PATENT DOCUMENTS

| | | |
|---|---|---|
| CN | 1642305 A | 7/2005 |
| CN | 101026577 A | 8/2007 |
| CN | 101252451 A | 8/2008 |
| CN | 101261592 A | 9/2008 |
| CN | 101610198 A | 12/2009 |
| CN | 102014052 A | 4/2011 |

* cited by examiner

*Primary Examiner* — Wei Zhao
*Assistant Examiner* — Abdeltif Ajid (57) ABSTRACT

Embodiments of the present invention provide a scheduling implementation method, apparatus, and system. The method includes: according to a processing delay and user priority information of a user processing request, determining a priority to which the user processing request currently belongs; if the user processing request is not recorded in a priority queue corresponding to the priority to which the user processing request currently belongs, writing the user processing request into the priority queue corresponding to the priority to which the user processing request currently belongs; and in a situation that a processing apparatus is in an idle state, reading a user processing request in a non-empty priority queue with a highest priority, and if the user processing request with the highest priority does not time out, sending the user processing request with the highest priority to the processing apparatus.

18 Claims, 8 Drawing Sheets

FIG. 12 though small; however, when the number of users is increased, for a certain user, the sum of multiple access interference generated by other users on the user is large. When a near-far effect exists and a signal amplitude of a certain user is large, multiple access interference generated by the user on a user having a weak signal is large. A single-user receiver cannot eliminate an impact of the multiple access interference on user signal detection, and the multiple access interference limits improvement of capacity and performance of the CDMA system.

SCHEDULING IMPLEMENTATION METHOD, APPARATUS, AND SYSTEM

CROSS-REFERENCE TO RELATED APPLICATION

This application claims priority to Chinese Patent Application No. 201210223043.7, filed on Jun. 30, 2012, which is hereby incorporated by reference in its entirety.

TECHNICAL FIELD

The present invention relates to the field of communications, and in particular, to a scheduling implementation method, apparatus, and system.

BACKGROUND

A CDMA system has become a development direction of the third generation mobile communication because of its advantages such as high capacity, high service quality, and good confidentiality. In an actual CDMA communication system, certain correlation exists between user signals, so that multiple access interference (Multiple Access Interference) exists in the communication system. Multiple access interference generated by a single user is usually small; however, when the number of users is increased, for a certain user, the sum of multiple access interference generated by other users on the user is large. When a near-far effect exists and a signal amplitude of a certain user is large, multiple access interference generated by the user on a user having a weak signal is large. A single-user receiver cannot eliminate an impact of the multiple access interference on user signal detection, and the multiple access interference limits improvement of capacity and performance of the CDMA system.

A multi-user detection technology is a key technology for overcoming interference in the CDMA system and is an enhanced technology for improving the capacity of the CDMA system. The multi-user detection technology can make full use of information of multiple users and perform joint detection on multiple user signals, so as to lower an impact of the multiple access interference on receiver performance as much as possible and improve the capacity of the system.

An interference cancellation method is a multi-user detection technology, where a signal of an expected user is regarded as a useful signal and signals of other users are regarded as interference signals; first, interference of signals of other users is eliminated from a received signal to obtain the signal of the expected user, and then detection is performed on the signal of the expected user, so as to improve the performance of the system.

In an interference cancellation system, a canceled user and a benefited user are separately scheduled. The canceled user is first scheduled and processed, and after the cancellation is completed, the benefited user is scheduled and processed, so as to guarantee that the benefited user can enjoy a cancellation gain.

In the process of implementation of the foregoing scheduling, the inventor finds that the prior art at least has the following problem: When it is guaranteed that a benefited user enjoys a cancellation gain, if the number of canceled users is less than the number of benefited users, the system allocates a cancellation processing time the same as the number of benefited users to process the canceled users, so that the cancellation processing time is longer than time required to process the canceled user, and a processing delay of the benefited user is increased; therefore, data of a part of benefited users that needs to be processed is discarded because the processing delay exceeds timeout duration of the user, and the processing capability of the system is not fully used.

SUMMARY

Embodiments of the present invention provide a scheduling implementation method, apparatus, and system, which are used to automatically adjust respective priority of each user according to a processing delay of a benefited user and a processing delay of a canceled user, and process a user request according to the priority, so as to achieve an objective of guaranteeing the system performance when the processing capability of the system is fully used.

In order to achieve the foregoing objective, the embodiments of the present invention adopt the following technical solutions:

In an aspect, an embodiment of the present invention provides a scheduling implementation method, including: according to a processing delay and user priority information of a user processing request, determining a priority to which the user processing request currently belongs, where the user priority information is used to record priority-related information of the user processing request; if the user processing request is not recorded in a priority queue corresponding to the priority to which the user processing request currently belongs, writing the user processing request into the priority queue corresponding to the priority to which the user processing request currently belongs; and in a situation that a processing apparatus is in an idle state, reading a user processing request in a non-empty priority queue with a highest priority, and if the user processing request with the highest priority does not time out, sending the user processing request with the highest priority to the processing apparatus.

In another aspect, an embodiment of the present invention further provides a scheduling implementation method, including: according to a user processing request, determining user priority information of the user processing request, where the user priority information is used to record information related to a priority of the user processing request; adding the user priority information into the user processing request; and sending, to a scheduling processor, the user processing request carrying the user priority information.

In another aspect, an embodiment of the present invention provides a scheduling processor, including: a determination unit, configured to: according to a processing delay and user priority information of a user processing request, determine a priority to which the user processing request currently belongs, where the user priority information is used to record priority-related information of the user processing request; a write unit, configured to: in a situation that the user processing request is not recorded in a priority queue corresponding to the priority to which the user processing request currently belongs and which is determined by the determination unit, write the user processing request into the priority queue corresponding to the priority to which the user processing request currently belongs; a processing unit, configured to: in a situation that a processing apparatus is in an idle state, read a user processing request in a non-empty priority queue with a highest priority, and if the user processing request with the highest priority does not time out, send the user processing request with the highest priority to the processing apparatus; and a first buffer unit, configured to store the priority queue.

In another aspect, an embodiment of the present invention provides a user equipment, including: a determination unit, configured to: according to a user processing request, determine user priority information of the user processing request, where the user priority information is used to record information related to a priority of the user processing request; an addition unit, configured to add the user priority information into the user processing request; and a sending unit, configured to send, to a scheduling processor, the user processing request carrying the user priority information.

In another aspect, an embodiment of the present invention provides a scheduling implementation system, including a scheduling processor, a user equipment, and a processing apparatus, where the scheduling processor is the foregoing scheduling processor, and the user equipment is the foregoing user equipment.

The embodiments of the present invention provide a scheduling implementation method, apparatus, and system. According to a processing delay and user priority information of a user processing request, a priority to which the user processing request currently belongs is determined; when a priority queue corresponding to the determined current priority does not have the user processing request, the user processing request is written into the corresponding priority queue, that is, the priority of the user processing request is adjusted; and when a processing apparatus is idle, a user processing request in a queue with a highest priority is read; and in a situation that the user processing request does not time out, the user processing request is sent to the processing apparatus. A priority of a user is automatically adjusted according to a processing delay of the user, so as to automatically adjust respective priority of each user according to a processing delay of a benefited user and a processing delay of a canceled user, and process a user request according to the priority, thereby achieving an objective of guaranteeing the system performance when the processing capability of the system is fully used.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

Figure 1:
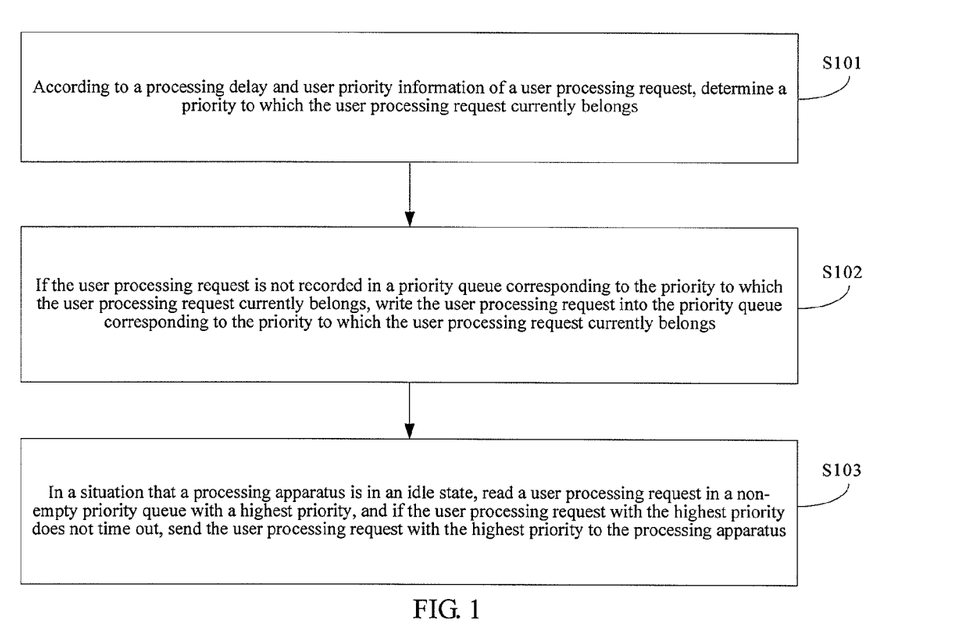
FIG. 1 is a first schematic diagram of a scheduling implementation method according to an embodiment of the present invention.

An embodiment of the present invention provides a scheduling implementation method. As shown in FIG. 1, the method includes:

S101: According to a processing delay and user priority information of a user processing request, determine a priority to which the user processing request currently belongs.

The user priority information is used to record priority-related information of the user processing request, and includes at least one priority to which the user processing request belongs and a time interval corresponding to the at least one priority. The user priority information is preset.

Further, reference time and user timeout duration information are further carried in the user processing request. The reference time refers to system time of a system when the user processing request is initiated. The reference time is not changed after being determined. The user timeout duration information is used to record a preset maximum processing delay of the user processing request, that is, user timeout duration. The user timeout duration information is preset by the system.

It should be noted that, system time refers to time used to identify time in the system, and the system time is constantly changed. A user processing delay of the user processing request refers to time during which the user processing request waits to be processed.

It should be noted that, the length of the user processing delay may be obtained through the system time and the reference time of the user processing request.

It should be noted that, queues in all embodiments of the present invention are classified into a priority queue and a preprocessing queue. The preprocessing queue is used to buffer a received user processing request, and priorities of user processing requests in the preprocessing queue are not differentiated. The priority queue is used to buffer a user processing request according to a priority.

Preferably, a priority of the priority queue is set according to a priority queue number. Optionally, the priority corresponding to the priority queue is lowered with the increase of the priority queue number.

Specifically, according to the processing delay and the user priority information of the user processing request in the queue, the priority to which the user processing request currently belongs is determined, so as to adjust a priority queue where the user processing request is currently located.

Further, if a queue is a priority queue, only a priority queue is contained in a scheduling processor, and according to the processing delay and the user priority information of the user processing request in the priority queue, the priority to which the user processing request currently belongs is determined.

Specifically, according to reference time in a current user processing request in the priority queue and the system time, the processing delay of the user processing request is obtained, and according to the user priority information carried in the user processing request, a time interval of a priority corresponding to the priority queue where the user processing request is currently located is obtained. The processing delay is compared with the time interval to view whether the processing delay is in the time interval. If the processing delay is in the time interval, it is indicated that the priority of the user processing request is the priority corresponding to the priority queue where the user processing request is currently located, so the user processing request does not need to be adjusted into other priority queues. If the processing delay is greater than a maximum value of the time interval corresponding to the user processing request in the priority queue, it is indicated that the priority corresponding to the priority queue where the user processing request is currently located is lower than an actually required priority, so an appropriate priority is found according to the user priority information and the priority is determined as the priority to which the user processing request currently belongs.

It should be noted that, one priority queue corresponds to one priority, and at least one user processing request may be stored in each priority queue. If multiple user processing requests are stored in a priority queue, in the same priority queue, time intervals of a priority of the priority queue corresponding to different user processing requests may be different.

It should be noted that, the user priority information carried in the user processing request is preset, that is to say, the number of priorities corresponding to each user and a time interval corresponding to each priority are preset. When the scheduling processor adjusts a priority queue where the user processing request is located, that is, adjusting the priority of the user processing request, the scheduling processor needs to select an appropriate priority from several priorities preset in the user priority information carried in the user processing request.

Exemplarily, priority queue 1 corresponds to priority 1, priority queue 2 corresponds to priority 2, priority queue 3 corresponds to priority 3, priority 1 is higher than priority 2, and priority 2 is higher than priority 3. At this time, system time is 11 ms, and user processing requests a, b, c, and d exist, and their respective user priority information is described in Table 1.

TABLE 1

| | Priority queue 1 | Priority queue 2 | Priority queue 3 | Reference time |
|---|---|---|---|---|
| a | 8-10 ms | 6-8 ms | 4-6 ms | 2 |
| b | 9-12 ms | 6-9 ms | 3-6 ms | 1 |
| c | 10-15 ms | 5-10 ms | 0-5 ms | 3 |
| d | 10-15 ms | 5-10 ms | 0-5 ms | 4 |

At this time, user processing requests a, b, c, and d are successively stored in a first position of priority queue 1 corresponding to priority 1, a first position of priority queue 2 corresponding to priority 2, a first position of priority queue 3 corresponding to priority 3, and a second position of priority queue 3 corresponding to priority 3.

It should be noted that, the first position is the first position of a queue in a priority queue, and the second position is the second position of the queue in the priority queue.

First, it is obtained that reference time of the user processing request a at the first position of the priority queue 1 is 2 ms, and system time is 11 ms, so a processing delay of user processing request a is 9 ms, and according to user priority information carried in user processing request a, it is obtained that a time interval of priority 1 corresponding to user processing request a in priority queue 1 is 8 ms to 10 ms. The processing delay of 9 ms is in the time interval 8 ms to 10 ms, and it is indicated that the priority corresponding to the priority queue where user processing request a is currently located is appropriate, so the priority queue does not need to be adjusted. A priority to which the user processing request at the first position of priority queue 2 currently belongs is continuously determined. It is obtained that reference time of user processing request b at the first position of priority queue 2 is 1 ms, and system time is 11 ms, so a processing delay of user processing request b is 10 ms, and according to user priority information carried in user processing request b, it is obtained that a time interval of priority 2 corresponding to the user processing request b in priority queue 2 is 6 ms to 9 ms. The processing delay 10 ms is greater than a maximum value of the time interval 6 ms to 9 ms, and it is indicated that priority 2 corresponding to priority queue 2 is lower than a priority actually required by user processing request b. By viewing the user priority information carried in user processing request b, it is known that an appropriate priority of user processing request b is priority 1, and priority 1 is determined as a priority to which user processing request b currently belongs. Subsequently, a priority to which the user processing request at the first position in priority queue 3 currently belongs is determined. It is obtained that reference time of user processing request c at the first position of priority queue 3 is 3 ms, and system time is 11 ms, so a processing delay of user processing request c is 7 ms, and according to user priority information carried in user processing request c, it is obtained that a time interval of priority 3 corresponding to user processing request c in priority queue 3 is 0 ms to 5 ms. The processing delay of 7 ms is greater than a maximum value of the time interval 0 ms to 5 ms, and it is indicated that a corresponding priority in priority queue 3 is lower than a priority actually required by user processing request c. By viewing the user priority information carried in user processing request c, it is known that an appropriate priority of user processing request c is priority 2, and priority 2 is determined as a priority to which user processing request c currently belongs.

If the queue is a preprocessing queue, a priority queue and a preprocessing queue are contained in a scheduling apparatus, and according to the processing delay and the user priority information of the user processing request in the preprocessing queue, the priority to which the user processing request currently belongs is determined.

Specifically, according to reference time of a current user processing request in the preprocessing queue and the system time, the processing delay of the current user processing request is obtained, and according to the user priority information carried in the user processing request, a time interval corresponding to each priority in at least one priority to which the user processing request belongs is obtained. The processing delay is compared with each time interval to view whether the processing delay is in the foregoing time intervals. If the processing delay is in one of the time intervals, it is indicated that a priority queue where the user processing request is currently located times out, so a priority corresponding to the time interval where the processing delay is located is found and the priority is determined as the priority to which the user processing request currently belongs. If the processing delay is not in the foregoing time intervals and the processing delay is greater than timeout duration of the user processing request, it is indicated that the user processing request times out, so the user processing request is deleted.

S102: If the user processing request is not recorded in a priority queue corresponding to the priority to which the user processing request currently belongs, write the user processing request into the priority queue corresponding to the priority to which the user processing request currently belongs.

Specifically, if only a priority queue is contained in the scheduling processor, after the priority to which the user processing request currently belongs is determined in step S101, it is viewed whether the priority queue corresponding to the priority has the user processing request. If yes, it is indicated that the priority of the priority queue where the user processing request is located is the determined priority to which the user processing request currently belongs, so the priority does not need to be adjusted. If no, the user processing request is written into the priority queue corresponding to the priority to which the user processing request currently belongs.

If a preprocessing queue and a priority queue are included in the scheduling processor, after the priority to which the user processing request currently belongs is determined in step S101, the user processing request is written into the priority queue corresponding to the priority, and the priority and relevant information are deleted from the user priority information carried in the user processing request.

It should be noted that, the writing the user processing request into the priority queue corresponding to the priority to which the user processing request currently belongs is writing the user processing request into a priority queue that the user processing request needs to be adjusted into, and deleting a user processing request from an original priority queue.

S103: In a situation that a processing apparatus is in an idle state, read a user processing request in a non-empty priority queue with a highest priority, and if the user processing request with the highest priority does not time out, send the user processing request with the highest priority to the processing apparatus.

Specifically, in the situation that the processing apparatus is in the idle state, the non-empty queue with the highest priority is found, and the user processing request in the queue is read. According to reference time of the user processing request and system time, a processing delay of the user processing request is obtained, and according to user priority information, a time interval of a priority of the priority queue corresponding to the user processing request is obtained. Whether the processing delay of the user processing request exceeds the time interval of the priority of the priority queue corresponding to the user processing request in the priority queue is determined; if no, the user processing request is sent to the processing apparatus; if yes, and if the processing delay is greater than a maximum value of the time interval, it is indicated the user processing request times out, so the user processing request is deleted and a next user processing request is continuously viewed.

It should be noted that, the order of performing step S101 to S103 may be that steps S101 and S102 are first performed, and then step S103 is performed, may also be that step S103 is first performed, and then steps S101 and S102 are performed, and may further be that steps S103 and S101 are performed at the same time, which is not limited in the embodiment of the present invention. In all embodiments of the present invention, an example of first performing steps S101 and S102 and then performing step S103 is taken for illustration.

The embodiment of the present invention provides a scheduling implementation method. According to a processing delay and user priority information of a user processing request, a priority to which the user processing request currently belongs is determined; when a priority queue corresponding to the determined current priority does not have the user processing request, the user processing request is written into the corresponding priority queue, that is, the priority of the user processing request is adjusted; and when a processing apparatus is idle, a user processing request in a queue with a highest priority is read; and in a situation that the user processing request does not time out, the user processing request is sent to the processing apparatus. A priority of a user is automatically adjusted according to a processing delay of the user, so as to automatically adjust respective priority of each user according to a processing delay of a benefited user and a processing delay of a canceled user, and process a user request according to the priority, thereby achieving an objective of guaranteeing the system performance when the processing capability of the system is fully used.

Figure 2:
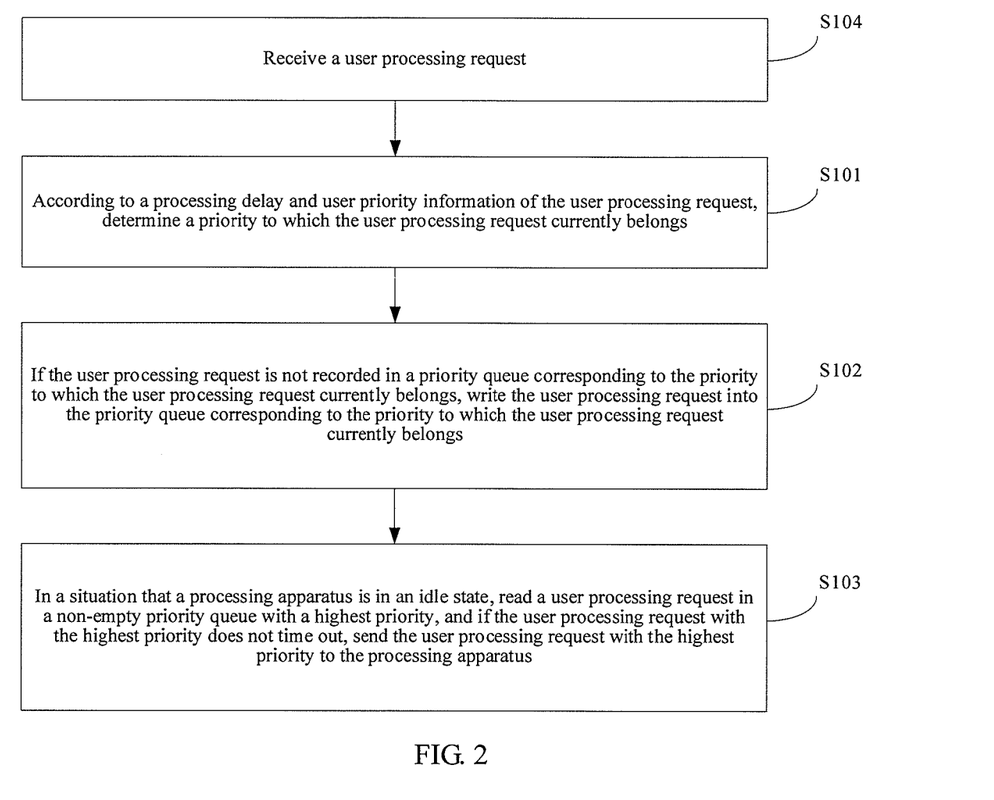
FIG. 2 is a second schematic diagram of a scheduling implementation method according to an embodiment of the present invention.

As shown in FIG. 2, before step S101, the foregoing method further includes:

S104: Receive the user processing request, where the reference time of the user processing request is carried in the user processing request.

At this time, the determining the priority to which the user processing request currently belongs according to the processing delay and the user priority information of the user processing request in step S101 includes:

according to the system time and the reference time of the user processing request, determining the processing delay of the user processing request, and according to the processing delay of the user processing request, determining, from the user priority information, the priority to which the user processing request currently belongs.

Specifically, the reference time, the user timeout duration information, and the user priority information are carried in the user processing request. According to the reference time of the user processing request and the system time, the processing delay of the user processing request can be obtained, and according to the processing delay, the priority to which the user processing request currently belongs is selected from at least one priority to which the user processing request belongs in the user priority information. In this way, the priority of the user processing request is increased with the increase of the processing delay of the user processing request, so it is only required to adjust the user processing request into a queue with a high priority, and when the processing delay is compared with a time interval corresponding to the user processing request in the queue, it is only required to determine whether the processing delay exceeds a maximum value of the time interval.

Through step S103 and after the user processing request is received, the priority to which the user processing request currently belongs is selected from at least one priority in the user priority information carried in the user processing request, and the user processing request is written into the corresponding priority queue. In this way, the priority is selected for the user processing request according to the processing delay, which can adjust a user processing request, which is about to time out, into a priority queue corresponding to a high priority, so that the user processing request is processed as soon as possible, thereby guaranteeing the processing capability of the system.

Figure 3:
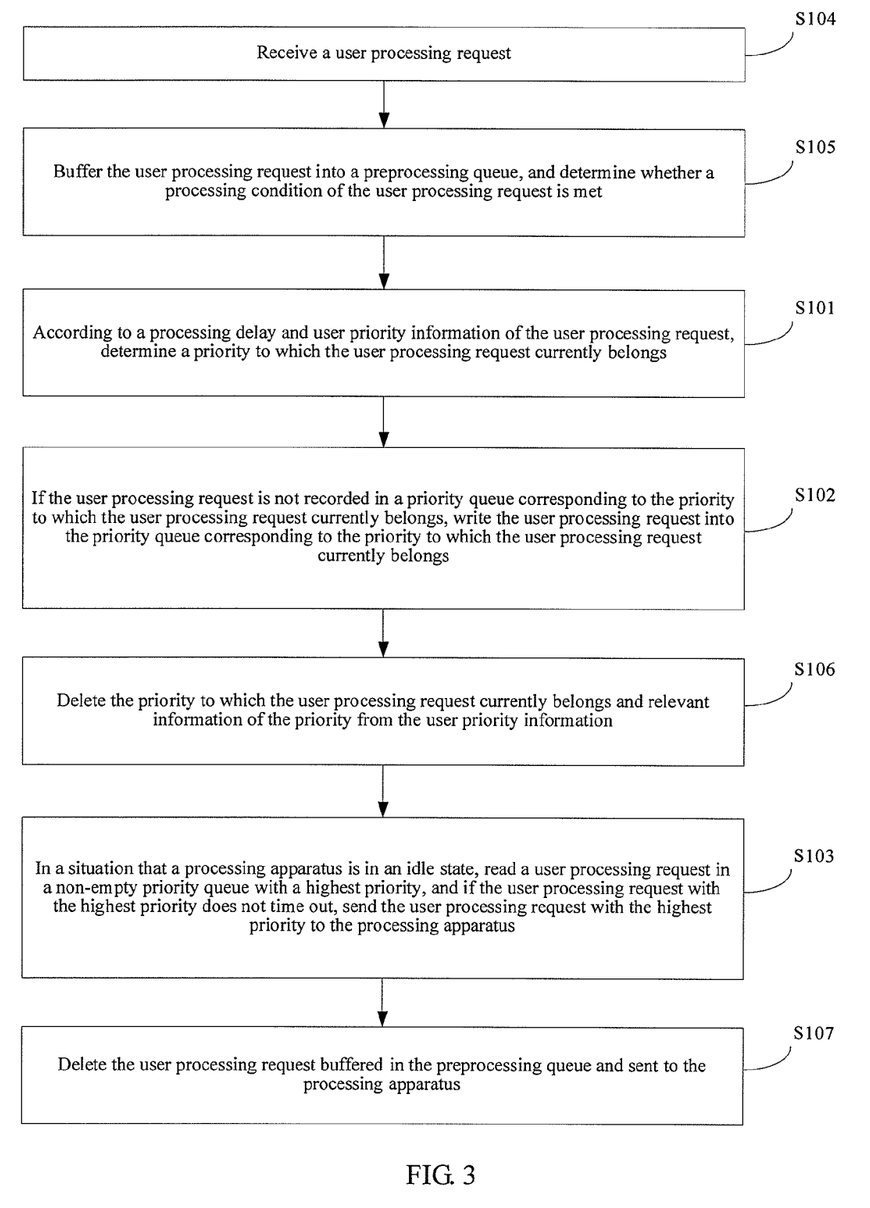
FIG. 3 is a third schematic diagram of a scheduling implementation method according to an embodiment of the present invention.

Further, a processing condition is further carried in the user processing request, and as shown in FIG. 3, before step S101, the foregoing method further includes:

S105: Buffer the user processing request into a preprocessing queue, and determine whether a processing condition of the user processing request is met.

Specifically, after the user processing request is received, the user processing request is buffered into the preprocessing queue, and it is determined whether the processing condition carried in the user processing request is met.

If the processing condition is met, step S101 is performed, that is, according to the processing delay and the user priority information of the user processing request, the priority to which the user processing request currently belongs is determined. If the processing condition is not met, the priority of the user processing request is temporarily not obtained, and step S101 is performed until the processing condition of the user is met.

It should be noted that, a pre-storage queue may buffer user processing requests according to different time intervals in user priority information in the user processing requests, that is, the pre-storage queue divides an area in advance according to time intervals in the user priority information, and buffers the user processing requests into areas corresponding to different time intervals. The pre-storage queue may also not divide an area and only buffer a user processing request once, which is not limited in the present invention.

After step S102, the method further includes:

S106: Delete the priority to which the user processing request currently belongs and relevant information of the priority from the user priority information.

Specifically, after the user processing request is written, according to the priority to which the user processing request currently belongs, into the priority queue corresponding to the priority to which the user processing request currently belongs, the priority and the time interval corresponding to the priority are deleted from the user priority information carried in the user processing request.

It should be noted that, when the user priority information is null, it is indicated that the user processing request is adjusted into a queue with a highest priority to which the user processing request belongs, so the scheduling apparatus no longer adjusts the priority queue where the user processing request is located.

The deleting the user processing request buffered in the preprocessing queue may be: deleting when the processing delay exceeds the user timeout duration, and may also be first marking the user processing request of which the user priority information is empty, and then deleting the marked user processing request.

Preferably, after step S103, the method further includes:

S107: Delete the user processing request buffered in the preprocessing queue and sent to the processing apparatus.

Specifically, after the user processing request is sent to the processing apparatus, all user processing requests buffered in the preprocessing queue are deleted, so as to avoid rewriting the user processing request into the priority queue.

Through steps S105, S106, and S107, the received user processing request is first buffered into the preprocessing queue, then the priority to which the user processing request that meets the processing condition currently belongs is determined, and the user processing request is written into the priority queue corresponding to the priority to which the user processing request currently belongs, which implements writing the user processing request into the priority queue with reference to the processing delay and other processing conditions, so as to achieve an objective of guaranteeing the system performance when the processing capability of the system is fully used.

Figure 4:
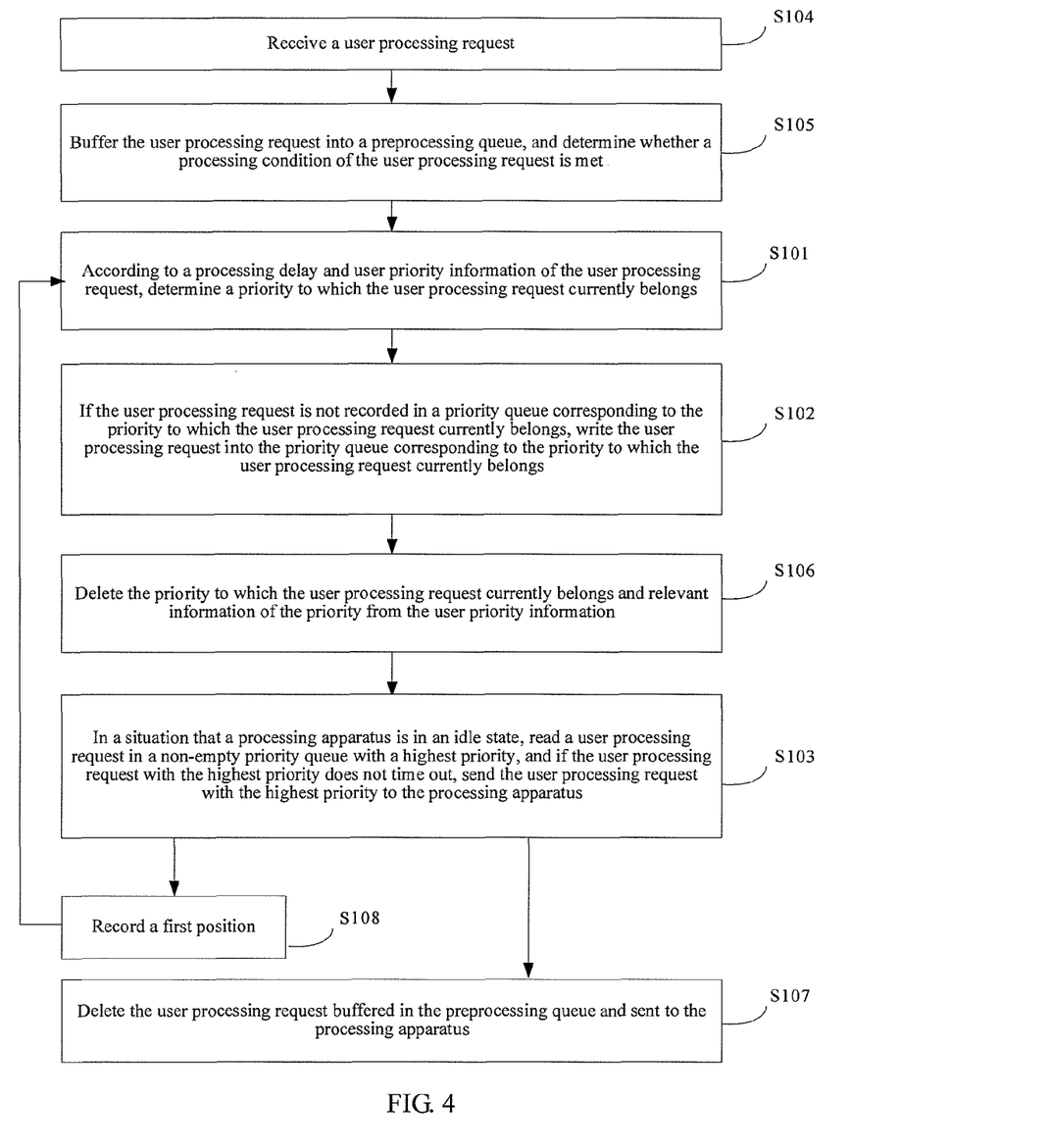
FIG. 4 is a fourth schematic diagram of a scheduling implementation method according to an embodiment of the present invention.

Further, as shown in FIG. 4, the foregoing method further includes:

S108: Record a first position.

The first position is a position of a next user processing request of the currently adjusted user processing request in a process of adjusting the priority where the user processing request is currently located.

At this time, step S101 specifically is: according to the first position, a user processing request in a queue is found, and according to the processing delay and the user priority information of the user processing request, the priority to which the user processing request currently belongs is determined. The first position is updated according to a position of the next user processing request of the currently adjusted user processing request.

The position of the next user processing request is known according to the first position, and the first position is updated according to the position of the next user processing request of the currently adjusted user processing request. Preferably, the first position is an address of the user processing request, and at this time, an address of the next user processing request may be known according to the first position.

It should be noted that, if the scheduling processor only includes a priority queue, the next user processing request of the currently adjusted user processing request refers to a first user processing request in a next priority queue of the priority queue where the currently adjusted user processing request is located, and the first position records a position of the first user processing request in the next priority queue of the priority queue where the currently adjusted user processing request is located.

If the scheduling processor contains a preprocessing queue and a priority queue, the next user processing request of the currently adjusted user processing request refers to a next user processing request of the currently adjusted user processing request in the preprocessing queue, and the first position refers to a position of the next user processing request of the currently adjusted user processing request in the preprocessing queue.

It should be noted that, when the first position is recorded for the first time, a position of a user processing request first one written into the queue may be used as the first position needing to be recorded for the first time, or when the processing apparatus is not idle, a position of a first user processing request in a non-empty queue with a highest priority may be used as the first position needing to be recorded for the first time, or another position of a user processing request may be used as the first position needing to be recorded for the first time, which is not limited in the present invention.

Through step S108, the first position is recorded, the user processing request is searched for according to the first position, and the priority where the user processing request is adjusted. In this way, after an operation of sending the user processing request to the processing apparatus or writing the user processing request into the queue is performed, the position of the user processing request to be adjusted can be found according to the first position. The priorities of the user processing requests are continuously polled and adjusted, so as to adjust the priority queues where the user processing requests is located, so that a priority of each user processing request can be fairly adjusted.

The embodiment of the present invention provides a scheduling implementation method. A user processing request is received and buffered into a preprocessing queue, a priority to which the user processing request currently belongs is selected according to reference time of the user processing request and system time, and the user processing request is buffered into a corresponding priority queue. Alternatively, a priority to which the user processing request currently belongs is selected according to reference time of the user processing request and system time, and the user processing request is directly buffered into a corresponding priority queue. The priority to which the user processing request currently belongs is determined through a processing delay and user priority information of the user processing request; when a priority queue corresponding to the determined current priority does not have the user processing request, the user processing request is written into the corresponding priority queue, that is, the priority of the user processing request is adjusted; and when a processing apparatus is idle, a user processing request in a queue with a highest priority is read; and in a situation that the user processing request does not time out, the user processing request is sent to the processing apparatus. By adjusting the current priority of the user processing request, a priority of a user according to a processing delay of the user is automatically adjusted, so as to automatically adjust respective priority of each user according to a processing delay of a benefited user and a processing delay of a canceled user, and process a request message of the user according to the priority, thereby achieving an objective of guaranteeing the system performance when the processing capability of the system is fully used.

Figure 5:
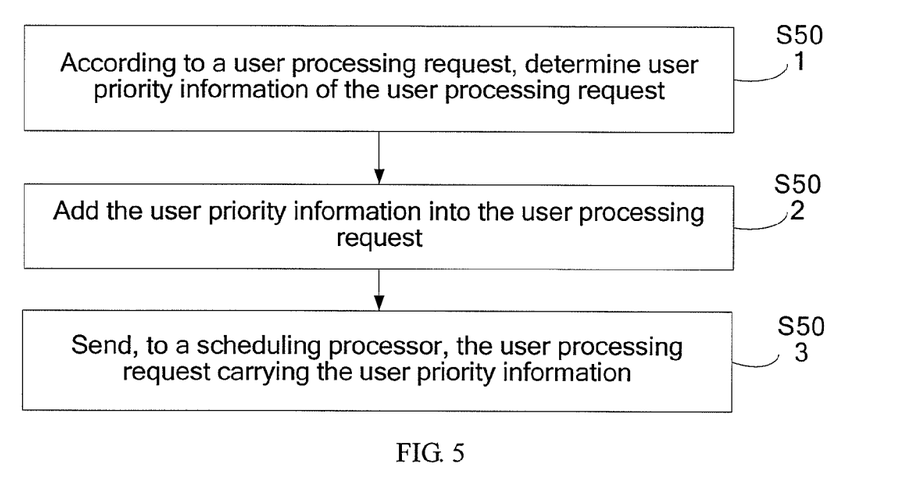
FIG. 5 is a schematic diagram of another scheduling implementation method according to an embodiment of the present invention.

An embodiment of the present invention provides a scheduling implementation method. As shown in FIG. 5, the method includes:

S501: According to a user processing request, determine user priority information of the user processing request.

The user priority information is used to record information related to a priority of the user processing request, and includes at least one priority to which the user processing request belongs and a time interval corresponding to the at least one priority.

Specifically, at least one priority to which the user processing request belongs and a time interval corresponding to the at least one priority are determined according to content of the user processing request.

S502: Add the user priority information into the user processing request.

Specifically, the at least one determined priority to which the user processing request belongs and the time interval corresponding to the at least one priority are added into the user processing request.

Further, a processing condition of the user processing request is also added into the user processing request. The processing condition is a condition met for processing the user processing request.

S503: Send, to a scheduling processor, the user processing request carrying the user priority information.

The embodiment of the present invention provides a scheduling implementation method. User priority information of a user processing request is determined through content of the user processing request, and the user processing request carrying the user priority information is sent to a scheduling processor, so that the scheduling processor determines, according to a processing delay and the user priority information of the user processing request, a priority to which the user processing request currently belongs, when a priority queue corresponding to the determined current priority does not have the user processing request, writes the user processing request into the corresponding priority queue, that is, adjusts the priority of the user processing request, and when a processing apparatus is idle, reads a user processing request in a queue with a highest priority, and in a situation that the user processing request does not time out, sends the user processing request to the processing apparatus. By adjusting the current priority of the user processing request, a priority of a user according to a processing delay of the user is automatically adjusted, so as to automatically adjust respective priority of each user according to a processing delay of a benefited user and a processing delay of a canceled user, and process a request message of the user according to the priority, thereby achieving an objective of guaranteeing the system performance when the processing capability of the system is fully used.

Figure 6:
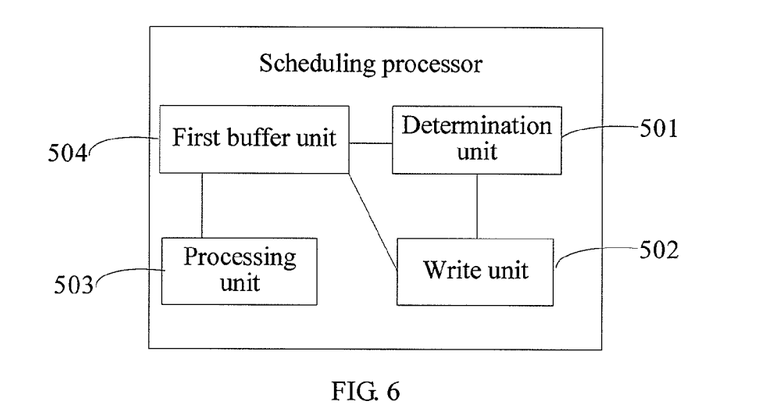
FIG. 6 is a schematic structural diagram of a scheduling processor according to an embodiment of the present invention.

An embodiment of the present invention provides a scheduling apparatus. As shown in FIG. 6, the scheduling apparatus includes:

a determination unit 501, configured to: according to a processing delay and user priority information of a user processing request, determine a priority to which the user processing request currently belongs, where the user priority information is used to record priority-related information of the user processing request;

a write unit 502, configured to: in a situation that the user processing request is not recorded in a priority queue corresponding to the priority to which the user processing request currently belongs and which is determined by the determination unit 501, write the user processing request into the priority queue corresponding to the priority to which the user processing request currently belongs;

a processing unit 503, configured to: in a situation that a processing apparatus is in an idle state, read a user processing request in a non-empty priority queue with a highest priority, and if the user processing request with the highest priority does not time out, send the user processing request with the highest priority to the processing apparatus; and a first buffer unit 504, configured to store the priority queue.

Preferably, a priority of the priority queue is set according to a priority queue number.

If only the priority queue is buffered in the scheduling processor, the determination unit 501 is specifically configured to: according to the processing delay and the user priority information of the user processing request in the priority queue in the first buffer unit 504, determine the priority to which the user processing request currently belongs.

Figure 7:
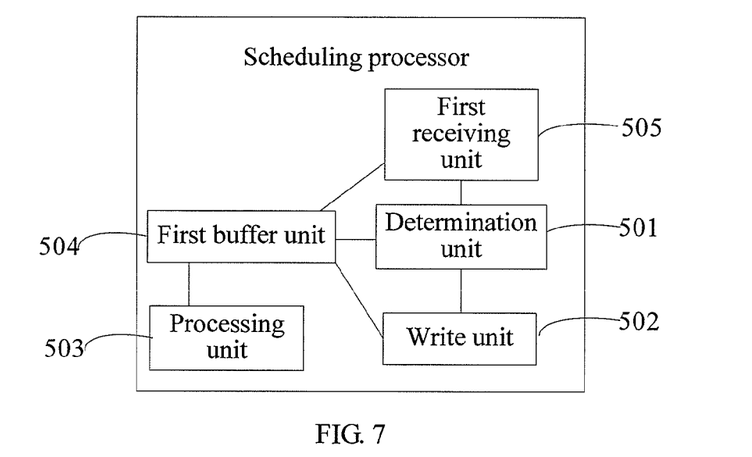
FIG. 7 is a schematic structural diagram of another scheduling processor according to an embodiment of the present invention.

As shown in FIG. 7, the foregoing apparatus further includes:

a first receiving unit 505, configured to receive the user processing request, where reference time of the user processing request is carried in the user processing request.

At this time, the determination unit 501 is specifically configured to: according to system time and the reference time of the user processing request, determine the processing delay of the user processing request; and according to the processing delay of the user processing request, determine, from the user priority information, the priority to which the user processing request currently belongs.

Figure 8:
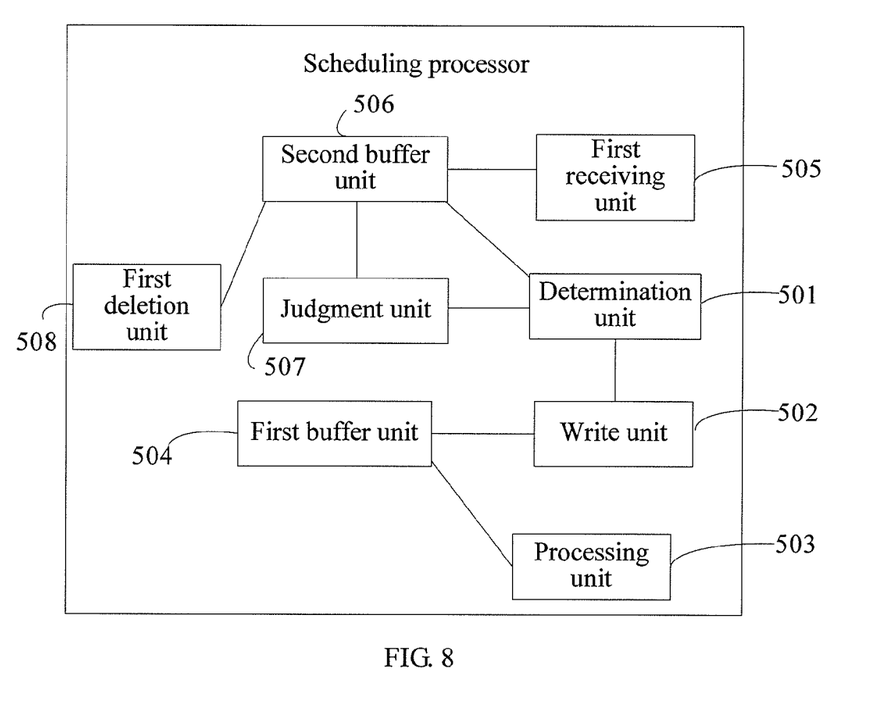
FIG. 8 is a schematic structural diagram of another scheduling processor according to an embodiment of the present invention.

As shown in FIG. 8, the foregoing apparatus further includes:

a second buffer unit 506, configured to buffer the user processing request into a preprocessing queue, where a processing condition is further carried in the user processing request, where specifically, if the preprocessing queue is buffered in the scheduling apparatus, the determination unit 501 is specifically configured to: according to the processing delay and the user priority information of the user processing request in the preprocessing queue in the second buffer unit 506, determine the priority to which the user processing request currently belongs;

a judgment unit 507; configured to determine whether the processing condition of the user processing request is met, where the determination unit 501 is specifically configured to: in a situation that the judgment unit 507 determines that the processing condition is met, and according to the processing delay and the user priority information of the user processing request, determine the priority to which the user processing request currently belongs; and a first deletion unit 508, configured to delete the priority to which the user processing request currently belongs and relevant information of the priority from the user priority information.

Figure 9:
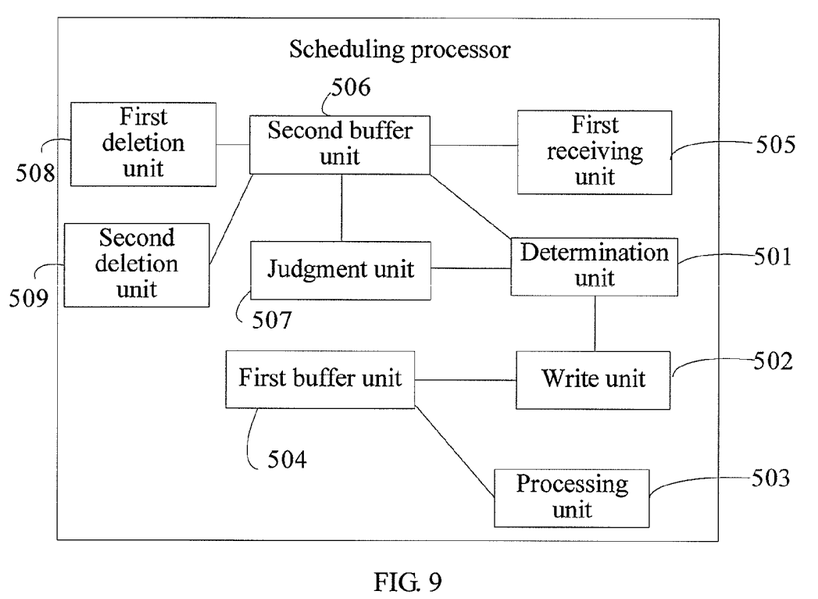
FIG. 9 is a schematic structural diagram of another scheduling processor according to an embodiment of the present invention.

As shown in FIG. 9, the foregoing apparatus further includes:

a second deletion unit 509, configured to delete the user processing request buffered in the preprocessing queue and sent to the processing apparatus.

Figure 10:
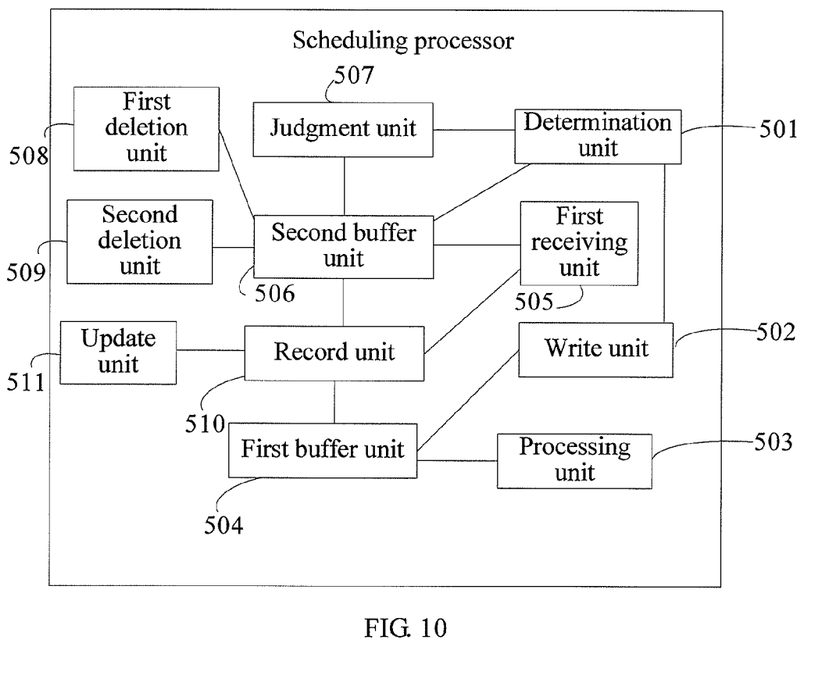
FIG. 10 is a schematic structural diagram of another scheduling processor according to an embodiment of the present invention.

As shown in FIG. 10, the foregoing apparatus further includes:

A record unit 510 is configured to record a first position.

The first position is a position of a next user processing request of the currently adjusted user processing request in a process of adjusting the priority of the user processing request.

Figure 11:
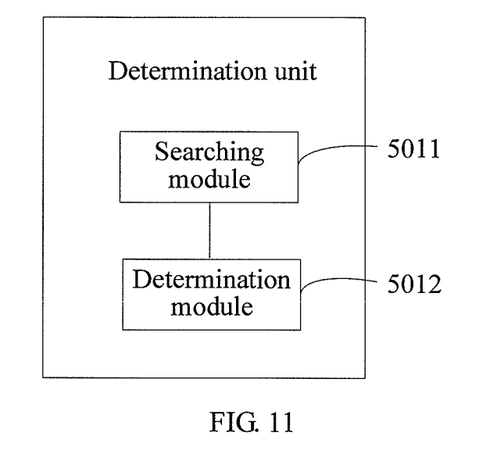
FIG. 11 is a schematic structural diagram of a determination unit of the scheduling processor shown in FIG. 10.

As shown in FIG. 11, the determination unit 501 includes a searching module 5011 and a determination module 5012, where The searching module 5011 is configured to find the user processing request in a queue according to the first position, and The determination module 5012 is configured to: according to the processing delay and the user priority information of the user processing request found by the searching module 5011, determine the priority to which the user processing request currently belongs; and An update unit 511 is configured to update the first position according to the position of the next user processing request of the currently adjusted user processing request.

The embodiment of the present invention provides a scheduling processor, where the scheduling processor: according to a processing delay and user priority information of a user processing request, determines a priority to which the user processing request currently belongs; when a priority queue corresponding to the determined current priority does not have the user processing request, writes the user processing request into the corresponding priority queue, that is, adjusts the priority of the user processing request; and when a processing apparatus is idle, reads a user processing request in a queue with a highest priority; and in a situation that the user processing request does not time out, sends the user processing request to the processing apparatus. By adjusting the current priority of the user processing request, a priority of a user according to a processing delay of the user is automatically adjusted, so as to automatically adjust respective priority of each user according to a processing delay of a benefited user and a processing delay of a canceled user, and process a request message of the user according to the priority, thereby achieving an objective of guaranteeing the system performance when the processing capability of the system is fully used.

Figure 12:
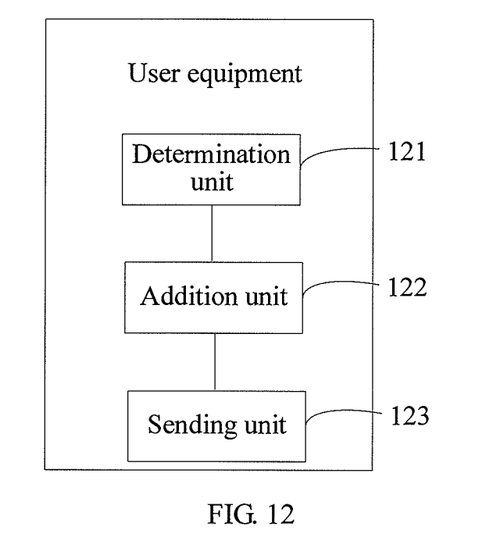
FIG. 12 is a schematic structural diagram of a user equipment according to an embodiment of the present invention.

An embodiment of the present invention provides a user equipment. As shown in FIG. 12, the user equipment includes:

a determination unit 121, configured to: according to a user processing request, determine user priority information of the user processing request, where the user priority information is used to record information related to a priority of the user processing request;

an addition unit 122, configured to add the user priority information determined by the determination unit 121 into the user processing request; and a sending unit 123, configured to send, to a scheduling processor, the user processing request carrying the user priority information, where a processing condition is further carried in the user processing request.

The embodiment of the present invention provides a user equipment, where the user equipment determines user priority information of a user processing request through content of the user processing request, and sends, to a scheduling processor, the user processing request carrying the user priority information, so that the scheduling processor: according to a processing delay and the user priority information of the user processing request, determines a priority to which the user processing request currently belongs; when a priority queue corresponding to the determined current priority does not have the user processing request, writes the user processing request into the corresponding priority queue, that is, adjusts the priority of the user processing request; and when a processing apparatus is idle, reads a user processing request in a queue with a highest priority; and in a situation that the user processing request does not time out, sends the user processing request to the processing apparatus. By adjusting the current priority of the user processing request, a priority of a user according to a processing delay of the user is automatically adjusted, so as to automatically adjust respective priority of each user according to a processing delay of a benefited user and a processing delay of a canceled user, and process a request message of the user according to the priority, thereby achieving an objective of guaranteeing the system performance when the processing capability of the system is fully used.

An embodiment of the present invention provides a scheduling implementation system, including: a scheduling processor, a user equipment, and a processing apparatus. The scheduling processor is the scheduling processor provided by the foregoing embodiment. The user equipment is the user equipment provided by the foregoing embodiment.

The embodiments of the present invention provide a scheduling implementation method, apparatus, and system. According to a processing delay and user priority information of a user processing request, a priority to which the user processing request currently belongs is determined; when a priority queue corresponding to the determined current priority does not have the user processing request, the user processing request is written into the corresponding priority queue, that is, the priority of the user processing request is adjusted; and when a processing apparatus is idle, a user processing request in a queue with a highest priority is read; and in a situation that the user processing request does not time out, the user processing request is sent to the processing apparatus. A priority of a user is automatically adjusted according to a processing delay of the user, so as to automatically adjust respective priority of each user according to a processing delay of a benefited user and a processing delay of a canceled user, and process a user request according to the priority, thereby achieving an objective of guaranteeing the system performance when the processing capability of the system is fully used.

The foregoing descriptions are merely specific embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A scheduling implementation method, comprising:
according to a processing delay and a user priority information of a user processing request, determining a priority to which the user processing request currently belongs, wherein the user priority information is used to record priority-related information of the user processing request, wherein determining the priority to which the user processing request currently belongs comprises:
obtaining a time interval corresponding to a priority of a priority queue in which the user processing request is currently located;
determining whether a processing delay of the user processing request is within the time interval; and
in response to the processing delay of the user processing request being within the time interval, indicating that the priority of the user processing request is the priority corresponding to the priority queue in which the user processing request is currently located;
if the user processing request is not recorded in a priority queue corresponding to the priority to which the user processing request currently belongs, writing the user processing request into the priority queue corresponding to the priority to which the user processing request currently belongs; and
in response to a processing apparatus being in an idle state, reading a user processing request in a non-empty priority queue with a highest priority, and if the user processing request with the highest priority does not time out, sending the user processing request with the highest priority to the processing apparatus, and if the user processing request with the highest priority does time out, deleting the user processing request in the non-empty priority queue with the highest priority and reading a next user processing request in the non-empty priority queue with the highest priority.

2. The method according to claim 1, wherein before determining the priority to which the user processing request currently belongs, the method further comprises:
receiving the user processing request, wherein a reference time of the user processing request is carried in the user processing request; and
determining the priority to which the user processing request currently belongs comprises:
according to a system time and the reference time of the user processing request, determining the processing delay of the user processing request, and
according to the processing delay of the user processing request, determining, from the user priority information, the priority to which the user processing request currently belongs.

3. The method according to claim 2, wherein a processing condition is further carried in the user processing request; and
before determining the priority to which the user processing request currently belongs, the method further comprises:
buffering the user processing request into a preprocessing queue, and determining whether the processing condition of the user processing request is met; and
determining the priority to which the user processing request currently belongs comprises:
if the processing condition is met, according to the processing delay and the user priority information of the user processing request, determining the priority to which the user processing request currently belongs; and
after writing the user processing request into the priority queue corresponding to the priority to which the user processing request currently belongs, the method further comprises:
deleting the priority to which the user processing request currently belongs and relevant information of the priority from the user priority information.

4. The method according to claim 3, wherein after sending the user processing request to the processing apparatus, the method further comprises:
deleting the user processing request buffered in the preprocessing queue and sent to the processing apparatus.

5. The method according to claim 3, wherein
determining the priority to which the user processing request currently belongs comprises:
according to the processing delay and the user priority information of the user processing request in the preprocessing queue, determining the priority to which the user processing request currently belongs.

6. The method according to claim 1, wherein determining the priority to which the user processing request currently belongs comprises:
according to the processing delay and the user priority information of the user processing request in the priority queue, determining the priority to which the user processing request currently belongs.

7. The method according to claim 1, wherein the priority of the priority queue is set according to a priority queue number.

8. The method according to claim 1, further comprising:
recording a first position, wherein the first position is a position of a next user processing request of a currently adjusted user processing request in a process of adjusting the priority where the user processing request is currently located, wherein
determining the priority to which the user processing request currently belongs comprises:
finding the user processing request according to the first position, and according to the processing delay and the user priority information of the user processing request, determining the priority to which the user processing request currently belongs; and updating the first position according to the position of the next user processing request of the currently adjusted user processing request.

9. A scheduling processor, comprising:
a determination unit, configured to: according to a processing delay and a user priority information of a user processing request, determine a priority to which the user processing request currently belongs, wherein the user priority information is used to record priority-related information of the user processing request, wherein determining the priority to which the user processing request currently belongs comprises:
obtaining a time interval corresponding to a priority of a priority queue in which the user processing request is currently located;

determining whether a processing delay of the user processing request is within the time interval; and in response to the processing delay of the user processing request being within the time interval, indicating that the priority of the user processing request is the priority corresponding to the priority queue in which the user processing request is currently located;

a write unit, configured to: in response to the user processing request not being recorded in a priority queue corresponding to the priority to which the user processing request currently belongs, write the user processing request into the priority queue corresponding to the priority to which the user processing request currently belongs;

a processing unit, configured to: in response to a processing apparatus being in an idle state, read a user processing request in a non-empty priority queue with a highest priority, and if the user processing request with the highest priority does not time out, send the user processing request with the highest priority to the processing apparatus, and if the user processing request with the highest priority does time out, delete the user processing request in the non-empty priority queue with the highest priority and read a next user processing request in the non-empty priority queue with the highest priority; and a first buffer unit, configured to store the priority queue.

10. The processor according to claim 9, further comprising:

a first receiving unit, configured to receive the user processing request, wherein a reference time of the user processing request is carried in the user processing request, wherein the determination unit is configured to: according to a system time and the reference time of the user processing request, determine the processing delay of the user processing request, and according to the processing delay of the user processing request, determine, from the user priority information, the priority to which the user processing request currently belongs.

11. The processor according to claim 10, wherein a processing condition is further carried in the user processing request; and the processor further comprises:

a second buffer unit, configured to buffer the user processing request into a preprocessing queue;

a judgment unit, configured to determine whether the processing condition of the user processing request is met, wherein the determination unit is configured to: in response to the judgment unit determining that the processing condition is met, and according to the processing delay and the user priority information of the user processing request, determine the priority to which the user processing request currently belongs, and a first deletion unit, configured to delete the priority to which the user processing request currently belongs and relevant information of the priority from the user priority information.

12. The processor according to claim 11, further comprising:

a second deletion unit, configured to delete the user processing request buffered in the preprocessing queue and sent to the processing apparatus.

13. The processor according to claim 11, wherein the determination unit is configured to: according to the processing delay and the user priority information of the user processing request in the preprocessing queue in the second buffer unit, determine the priority to which the user processing request currently belongs.

14. The processor according to claim 9, wherein the determination unit is configured to: according to the processing delay and the user priority information of the user processing request in the priority queue in the first buffer unit, determine the priority to which the user processing request currently belongs.

15. The processor according to claim 9, wherein the priority of the priority queue is set according to a priority queue number.

16. The processor according to claim 9, further comprising:

a record unit, configured to record a first position, wherein the first position is a position of a next user processing request of a currently adjusted user processing request in a process of adjusting the priority where the user processing request is currently located, wherein the determination unit comprises: a searching module and a determination module, wherein the searching module is configured to find the user processing request according to the first position, and the determination module is configured to: according to the processing delay and the user priority information of the user processing request found by the searching module, determine the priority to which the user processing request currently belongs; and the processor further comprises:

an update unit, configured to update the first position according to the position of the next user processing request of the currently adjusted user processing request.

17. The method according to claim 1, wherein if the processing delay of the user processing request exceeds the time interval, and if the processing delay is greater than a maximum value of the time interval, the user processing request times out.

18. The processor according to claim 9, wherein if the processing delay of the user processing request exceeds the time interval, and if the processing delay is greater than a maximum value of the time interval, the user processing request times out.

* * * * *